Figure 1:
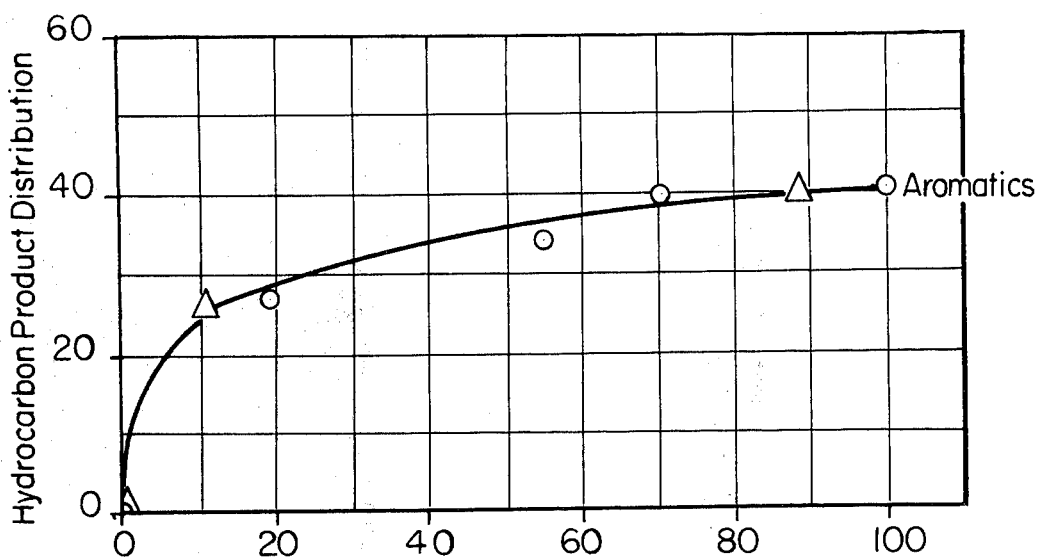

United States Patent [19]
Chang et al.

[11] 3,899,544
[45] Aug. 12, 1975

[54] CONVERSION OF ALCOHOLS AND ETHERS TO HYDROCARBONS

[75] Inventors: Clarence D. Chang, Princeton; William H. Lang, Pennington, both of N.J.

[73] Assignee: Mobil Oil Corporation, New York, N.Y.

[22] Filed: Mar. 28, 1974

[21] Appl. No.: 455,692

[52] U.S. Cl. ............ 260/668 C; 260/668 R; 208/DIG. 2 MS; 252/455 Z
[51] Int. Cl. .............................. C07c 1/20
[58] Field of Search ............ 260/668 C, 668 R; 252/455 Z; 208/DIG. 2 MS

[56] References Cited
UNITED STATES PATENTS

| | | | |
|---|---|---|---|
| 2,456,584 | 12/1948 | Gorin et al. | 260/668 R |
| 3,442,795 | 5/1969 | Kerr et al. | 208/DIG. 2 |
| 3,524,809 | 8/1970 | Hansford | 208/DIG. 2 |
| 3,728,408 | 4/1973 | Tobias | 260/668 C |

Primary Examiner—Veronica O'Keefe
Attorney, Agent, or Firm—Charles A. Huggett; Michael G. Gilman

[57] ABSTRACT

In the high temperature (500° to 850°F) conversion of alcohols and/or ethers to higher carbon number hydrocarbons by contact with a high silica to alumina ratio aluminosilicate zeolite having constraint index of about 1 to 12, such as ZSM-5, maximizing the $C_5^+$ hydrocarbon yield by incorporating a limited amount of a Bronsted or Lewis base, such as metal, particularly sodium or a Group Va element such as nitrogen or phosphorus as part of the cation in the zeolite catalyst.

8 Claims, 2 Drawing Figures

CONVERSION OF ALCOHOLS AND ETHERS TO HYDROCARBONS

This invention relates to the synthetic production of gasoline. It more particularly refers to improvements in the zeolite catalytic conversion of alcohols and/or ethers to gasoline boiling range hydrocarbons.

U.S. Patent applications Ser. Nos. 387,233 and 387,222 filed Aug. 9, 1973 disclose the conversion of alcohols and ethers respectively to higher hydrocarbons by contacting such at about 500° to 850°F with a zeolite catalyst having a silica to alumina ratio of at least about 12 and a constraint index of about 1 to 12. Preferred zeolite catalysts have crystal densities which are not substantially below about 1.6 grams per cubic centimeter. These special catalysts are exemplified in such applications by ZSM-5. U.S. Pat. No. 3,702,886), ZSM-11 (U.S. Pat. No. 3,709,979), ZSM-12 (West German Offenlagunschrifft No. 2,213,109), ZSM-21 (U.S. application Ser. No. 358,192 filed May 7, 1973), TEA mordenite (U.S. application Ser. No. 130,442 filed Apr. 11, 1971) and certain modified naturally occurring zeolites. The synthetic zeolites made using an organic cation are preferred.

It is generally accepted fact that zeolites in the alkali metal form are of substantially less catalytic activity; in some cases completely inactive. In the case of conversion of alcohols and ethers to higher hydrocarbons through zeolite catalysis as aforesaid, if the zeolite is fully exchanged so that its cation content is substantially only alkali metal, it loses substantially all of its activity to catalyze in this conversion. Such alkali metal form zeolites do however retain activity for some catalysis, notably the dehydration of alcohols to ethers and very small conversions of alcohols to dry gas (e.g., methane).

When substantially all of the alkali metal is exchanged out of the zeolite for acid cites, the catalyst is extremely active for converting alcohols and/or ethers to higher hydrocarbons. For example in the conversion of methanol to hydrocarbons in contact with an H ZSM-5 zeolite catalyst from which substantially all of the alkali metal (sodium) has been removed, the hydrocarbon yield at 100% feed conversion is consistently about 44 weight percent based upon methanol fed. Of course where none of the alkali metal has been removed the hydrocarbon yield is zero(0).

One particular attribute of the processes described in the referred to patent applications is the fact that the hydrocarbons produced are highly aromatic in nature, ranging up to about 40 weight percent aromatics at substantially complete sodium removal from the zeolite catalyst. Aromatics are of course possessed of very high blending octane numbers and therefore the "gasoline" produced using a substantially sodium free zeolite catalyst has a very high octane number.

It is an object of this invention to provide an improved process of higher hydrocarbons from alcohols and/or ethers.

It is another object of this invention to provide an improved catalyst for this process.

It is a further object of this invention to increase the yield of gasoline from such process.

Other and additional objects of this invention will become apparent from a consideration of this entire specification including the claims and the drawing hereof.

Figure 2:
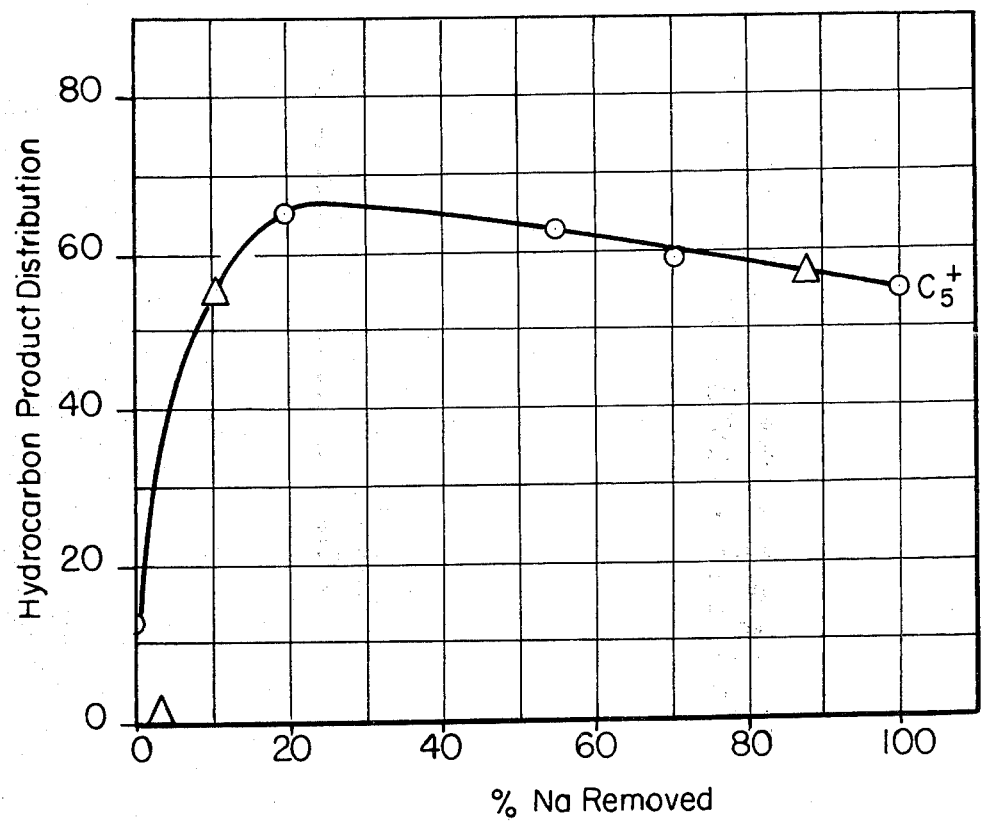

Understanding of this invention will be facilitated by reference to the accompanying drawing in which:

FIG. 1 is a plot of the aromatics yield by conversion of methanol as a function of sodium removed from a ZSM-5 catalyst; and FIG. 2 is a plot of the gasoline boiling range hydrocarbon yield by conversion of methanol as a function of sodium removed from a ZSM-5 catalyst.

In accord with and fulfilling these objects, one aspect of this invention resides in the discovery that the conversion of lower aliphatic organic compounds containing a hetero atom, such as oxygen, nitrogen, sulfur or halogen as exemplified by methanol, dimethyl ether, acetone, methyl mercaptan and the like, to higher hydrocarbons, particularly hydrocarbons boiling in the gasoline boiling range, e.g., $C_5$ to 400°F or any part thereof, can be improved if the zeolite known to catalyze this conversion is modified in a special prescribed manner. The conversion is carried out under the same conditions as previously prescribed, i.e., about 500° to 850°F, up to about 50 atmospheres, about 0.5 to 50 liquid hourly space velocity, in the substantial absence of added, preformed hydrogen. The special catalyst modification which makes possible the improved operations described herein comprises providing about 30 to 85%, preferably about 60 to 82% of the total cation cites of the aforementioned zeolite satisfied by basic cations which were not heretofore believed to have catalytic activity, notably Lewis or Bronsted bases such as elements of Group Ia or Va of the Periodic table. Particular exemplary cations which have been found to be particularly useful are those which contain sodium, potassium, nitrogen and phosphorus, alone or in appropriate cationic complex form.

In this regard, it is important to note that in the past, certain very active zeolite catalysts, such as those destined for use in fluid catalytic cracking processes, have been treated by various techniques in order to reduce their activity to the point that they had a commerically attractive life. In other words, in their untreated form they were so active in catalyzing hydrocarbon cracking that they sustained a remarkable coke buildup in a remarkably short time, so short as to be commerically unattractive. These hydrocarbon cracking catalysts were therefore treated so as to reduce their cracking activity in order to permit their commerical use. One of the known zeolite deactivation techniques is to incorporate alkali metal cations, particularly sodium and potassium therein. Since the catalytically active cites in the zeolite are believed to be the acid cationic cites, substituting sodium cations for some of these hydrogen cations was believed to, and actually did, reduce the acid catalysis capability of the zeolite. In other words, exchanging sodium for hydrogen cations reduces the activity of the zeolite cracking catalyst.

Carrying this information forward from zeolites which are particularly useful as fluid cracking catalysts to the zeolites described herein, which are per se known aliphatic aromatization catalysts, it is also known that the sodium cation form of these high silica to alumina ratio zeolites is substantially inactive for the conversion of gasoline boiling range hydrocarbons to a product having a higher aromatics content and therefore a higher octane number. Based upon these data zeolite aromatization catalysts have usually been made so as to contain substantially no residual alkali metal cation content.

It is usual to produce the zeolites used as aromatization catalysts from a composition containing an organic cation. After initially producing the zeolite crystal structure desired with its organic and alkali metal original cations in place, it is dried. At this point, the zeolite may be directly calcined, in which case the organic cations are oxidized and removed, to produce an alkali metal cation form of zeolite. It is then usual to exchange out the alkali metal either with other metal ions or with ammonium ions or both. Where acid cites are desired ammonium cations are provided. The ammonium form of the zeolite is then calcined to remove ammonia and leave the hydrogen form of the zeolite which is usually quite active catalytically. The order of exchange and calcination is quite variable with several different sequences of operation alleged to give special results for particular purposes. The order of exchange and calcination and the number of these operations is beyond the scope of this invention and not pertinent to it. Various exchange techniques are generally well known in the zeolite art (see U.S. Pat. Nos. 3,140,249; 3,140,251; and 3,140,253). Specific illustrative preparative techniques for the catalyst of this invention are set forth in the above referred to patents and patent applications directed to each individual exemplary zeolite catalyst. While invention is not claimed here in the catalyst preparative technique, it should be understood that in order to carry out this invention, it is necessary to modify the catalyst used either during preparation or thereafter so as to insure that a very carefully chosen proportion of alkali metal cation is associated in the zeolite when such is used for catalysts.

The alkali metal cation content of the zeolite catalyst of this invention has been stated above as being everything left after accounting for a certain proportion of acid cites in the zeolite. It is of course possible to state this limitation in a reverse mode, that is, reciting the percent alkali metal cation and noting that the remainder of the cation cites are acid and/or other cations.

The catalyst of this invention can be prepared by converting all of the cationic sites to the alkali metal form and then exchanging a prescribed proportion of the alkali metal cations for acid or other "active" cations. In the alternative, an acid form zeolite can be subjected to exchange with appropriate alkali metal moieties. There does not appear to be any preference in terms of original alkali metal or back exchanged alkali metal. Only the proportion thereof seems to be important.

It has been noted that zeolite catalyst of this invention has alkali metal and acid cationic sites. It may also have other cationic sites, such as hydrogenation/dehydrogenation components, incorporated for given purposes. These other sites are to be considered as part of the acid site group and are not to be considered as replacing alkali metal cation moieties. Particular additional cations which are useful in the process described herein are zinc and cadmium with or without the further addition of copper. The incorporation of these materials in zeolite catalysts of the type described herein is per se known, but not with the additional provision of alkali metal cations in the composition. These or further additional components can be incorporated with the zeolite catalyst by impregnation, vapor deposition or otherwise instead of by exchange as may seem desirable.

As was noted above, hydrocarbon fluid cracking catalysts are known to be partially deactivated and therefore rendered commercially attractive by incorporating some deactivating alkali metal cation therein. Surprisingly, according to this invention, the incorporation of a limited quantity of a Bronsted or Lewis base into a zeolite aromatization catalyst as aforesaid does not seem to deactivate it but rather seem to increase the activity thereof in terms of normally liquid hydrocarbon product production from light hetero-aliphatic organic compound reactants. It is most important to note that the feed to the catalytic conversion process described herein is critical. It comprises lower aliphatic compounds containing up to about 8 carbon atoms in any hydrocarbyl portion thereof and containing at least one oxygen, sulfur, nitrogen or halogen atom therein.

This invention will be illustrated by the following Examples which are in no way to be considered as limiting on the scope hereof. Parts and percentages are by weight unless expressly stated to be on some other basis.

EXAMPLE 1

Methanol was converted by passing such over an HZSM-5 catalyst at 700°F, atmospheric pressure and 1 LHSV. Conversion was about 100%. The converted product contained 44% hydrocarbon and 56% water. The hydrocarbon product contained 55% $C_5^+$ liquid, 45% gas ($C_4^-$).

EXAMPLE 2

Example 1 was repeated using a ZSM-5 zeolite from the same batch as in Example 1 but which had been back exchanged so that substantially its total cation population was sodium. Methanol conversion was 75.3%. The converted product contained 52.9% dimethyl ether, 0.7% hydrocarbon and 21.7% water and carbon oxides. The hydrocarbon product contained 12.7% $C_5^+$ and 87.3% gas ($C_4^-$).

EXAMPLE 3

Example 1 was repeated with another aliquot of the ZSM-5 catalyst containing 1 weight % nitrogen, introduced as α-picoline. Conversion was 72.6%. The converted product contained 31% dimethyl ether, 8.4% hydrocarbon and 33.7% water and carbon oxides. The hydrocarbon product contained 34.3% $C_5^+$ liquid and 65.7% $C_4^-$ gas.

EXAMPLE 4

Example 1 was repeated with another aliquot or ZSM-5 catalyst in which 89% of the cation content was sodium and 11% was hydrogen. Conversion was 72.2%. The converted product contained 37.2% dimethyl ether, 13.3% hydrocarbons and 21.7% water and carbon oxides. The hydrocarbon product contained 54.8% $C_5^+$ and 45.2% $C_4^-$.

EXAMPLE 5

Example 4 was repeated using a ZSM-5 catalyst in which 80% of the cation content was sodium and the remainder was hydrogen. Conversion was 98.8%. The converted product contained 1.1% dimethyl ether, 42.0% hydrocarbons and 55.7% water and carbon oxides. The hydrocarbon product contained 65.2% $C_5^+$ and 34.8% $C_4^-$.

EXAMPLE 6

Example 4 was repeated using a ZSM-5 catalyst in which 30% of the cation content was sodium and the remainder was hydrogen. Conversion was 100%. The converted product contained 44% hydrocarbon, and 56% water and carbon and oxides. The hydrocarbon product contained 59.6% $C_5{}^+$ and 40.4% $C_4{}^-$.

FIG. 1 hereof shows a plot of aromatics content of the hydrocarbon portion of the product of the process of this invention as a function of the sodium content of the catalyst. It should be noted that aromatics content is inversely proportional to catalyst sodium content. FIG. 2, however, is a plot of total $C_5{}^+$ (normally liquid) hydrocarbon product as a function of catalyst sodium content. Surprisingly enough this curve shows that liquid product yield is not similarly inversely proportional to sodium content but rather has an unexpected maximum region at a specified intermediate range of catalyst sodium content.

What is claimed is:

1. In the process of converting lower aliphatic organic feed compounds containing up to about 8 carbon atoms in a hydrocarbyl constituent thereof and at least one hetero atom selected from the group consisting of sulfur, oxygen, nitrogen and halogen to a higher hydrocarbon product having a substantial fraction in the $C_5$ to 400°F boiling range by contacting said feed with a crystalline aluminosilicate zeolite, havig a silica to alumina ratio of at least about 12 and a constraint index of about 1 to 12, at about 500° to 8850°F, up to about 50 atmospheres, 0.5 to 50 LHSV and in the substantial absence of added, preformed hydrogen; the improvement which comprises utilizing as said catalyst said zeolite containing about 30 to 85% of its cation cites satisfied by a Lewis or Bronsted base.

2. The improved process claimed in claim 1 wherein said base in a Group Ia or Va element cation.

3. The improved process claimed in claim 1 wherein said base is at least one member selected from the group consisting of sodium, nitrogen and phosphorus.

4. The improved process claimed in claim 1 wherein said feed is at least one member selected from the group consisting of alcohols, ethers, ketones, alkyl halides, mercaptans and amines.

5. The improved process claimed in claim 1 wherein said feed comprises methanol.

6. The improved process claimed in claim 1 wherein said feed comprises dimethyl ether.

7. The improved process claimed in claim 1 wherein said zeolite comprises ZSM-5.

8. The improved process claimed in claim 1 wherein said zeolite has incorporated therewith a member selected from the group consisting of zinc, cadmium, palladium and nickel.

* * * * *

UNITED STATES PATENT AND TRADEMARK OFFICE
CERTIFICATE OF CORRECTION

PATENT NO. : 3,899,544
DATED : August 12, 1975
INVENTOR(S) : CLARENCE D. CHANG and WILLIAM H. LANG It is certified that error appears in the above-identified patent and that said Letters Patent are hereby corrected as shown below:

| | |
|---|---|
| Column 4, line 40 | After "$C_5^+$" insert the word --liquid-- |
| Column 4, line 51 | "or" should be --of-- |
| Column 6, line 1 | "havig" should be --having-- |
| Column 6, line 3 | "8850°F" should be --850°F-- |

Signed and Sealed this twenty-seventh Day of January 1976

[SEAL]

Attest:

RUTH C. MASON
Attesting Officer

C. MARSHALL DANN
Commissioner of Patents and Trademarks